US012545181B2

(12) United States Patent
Nemoto (10) Patent No.: US 12,545,181 B2
(45) Date of Patent: Feb. 10, 2026

(54) DRIVER MONITORING DEVICE, DRIVER MONITORING METHOD, AND DRIVER MONITORING COMPUTER PROGRAM FOR NOTIFYING A DRIVER TO PAY ATTENTION

(71) Applicant: TOYOTA JIDOSHA KABUSHIKI KAISHA, Toyota (JP)

(72) Inventor: Hiromi Nemoto, Shinagawa-ku Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 23 days.

(21) Appl. No.: 18/631,755

(22) Filed: Apr. 10, 2024

(65) Prior Publication Data
US 2024/0351521 A1    Oct. 24, 2024

(30) Foreign Application Priority Data
Apr. 18, 2023   (JP) ................................. 2023-067821

(51) Int. Cl.
*B60Q 9/00*      (2006.01)
(52) U.S. Cl.
CPC ..................... *B60Q 9/00* (2013.01)

(58) Field of Classification Search
CPC ... B60Q 9/00; B60Q 1/00; B60Q 3/00; B60Q 3/40; B60Q 3/50; B60Q 3/54; B60Q 3/60; B60Q 3/70; B60Q 3/731; B60Q 3/735; B60Q 5/00
See application file for complete search history.

(56) References Cited

U.S. PATENT DOCUMENTS

| 2017/0225617 A1* | 8/2017 | Morimura | G06V 40/10 |
| 2019/0143893 A1* | 5/2019 | Hyuga | G06V 40/20 |
| | | | 340/576 |
| 2020/0327345 A1* | 10/2020 | Schumacher | G06V 20/58 |

FOREIGN PATENT DOCUMENTS

| EP | 3945002 A1 | 2/2022 |
| JP | 2009-230506 A | 10/2009 |
| JP | 2012-058999 A | 3/2012 |
| JP | 2015-024713 A | 2/2015 |
| JP | 2019-020638 A | 2/2019 |

* cited by examiner

*Primary Examiner* — Omer S Khan
(74) *Attorney, Agent, or Firm* — Dinsmore & Shohl LLP (57) ABSTRACT

A driver monitoring device includes a processor configured to calculate a degree of complexity of a situation around a vehicle based on at least one image generated by a camera mounted on the vehicle and representing the situation, set an alert condition for urging a driver of the vehicle to pay attention so that the alert condition is relaxed as the degree of complexity increases, detect a behavior of the driver, and notify the driver of an alert for paying attention via a notification device when the behavior of the driver satisfies the alert condition.

5 Claims, 5 Drawing Sheets

DRIVER MONITORING DEVICE, DRIVER MONITORING METHOD, AND DRIVER MONITORING COMPUTER PROGRAM FOR NOTIFYING A DRIVER TO PAY ATTENTION

CROSS-REFERENCE TO RELATED APPLICATIONS

This application claims priority to Japanese Patent Application No. 2023-067821 filed Apr. 18, 2023, the entire contents of which are herein incorporated by reference.

FIELD

The present disclosures relates to a driver monitoring device, a driver monitoring method, and a driver monitoring computer program for monitoring a driver of a vehicle.

BACKGROUND

A technique for alerting a driver of a vehicle based on a luminance change of a monitoring area including an image portion of a connection point between a traveling road and a side road has been proposed (see Japanese Unexamined Patent Publication JP2012-58999A).

SUMMARY

The ease with which a driver can recognize the presence of an object, such as a pedestrian trying to cross a roadway, that may interfere with the traveling of the vehicle varies depending on the situation around the vehicle.

It is an object of the present disclosure to provide a driver monitoring device capable of appropriately urging a driver to pay attention in accordance with a situation around a vehicle.

According to an embodiment, a driver monitoring device is provided. The driver monitoring device includes a processor configured to: calculate a degree of complexity of a situation around a vehicle based on at least one image generated by a camera mounted on the vehicle and representing the situation, set an alert condition for urging a driver of the vehicle to pay attention so that the alert condition is relaxed as the degree of complexity increases, detect a behavior of the driver, and notify the driver of an alert for paying attention via a notification device when the behavior of the driver satisfies the alert condition.

In the driver monitoring device, the complexity calculation unit calculates the degree of complexity for each of a plurality of partial regions into which the image is divided, and the setting unit relaxes the alert condition corresponding to a partial region with the degree of complexity being equal to or greater than a predetermined threshold among the plurality of partial regions than the alert condition corresponding to a partial region with the degree of complexity being less than the predetermined threshold.

Alternatively, the complexity calculation unit calculates a spatial complexity of the situation around the vehicle and a temporal complexity of the situation around the vehicle as the degree of complexity, and the setting unit sets the alert condition based on a higher one of the spatial complexity and the temporal complexity.

According to another embodiment, a driver monitoring method is provided. The driver monitoring method includes: calculating a degree of complexity of a situation around a vehicle based on at least one image generated by a camera mounted on the vehicle and representing the situation; setting an alert condition for urging a driver of the vehicle to pay attention so that the alert condition is relaxed as the degree of complexity increases; detecting a behavior of the driver; and notifying the driver of an alert for paying attention via a notification device when the behavior of the driver satisfies the alert condition.

According to still another embodiment, a non-transitory recording medium that stores a driver monitoring computer program is provided. The driver monitoring computer program includes instructions causing a processor mounted on a vehicle to execute a process including: calculating a degree of complexity of a situation around a vehicle based on at least one image generated by a camera mounted on the vehicle and representing the situation; setting an alert condition for urging a driver of the vehicle to pay attention so that the alert condition is relaxed as the degree of complexity increases; detecting a behavior of the driver; and notifying the driver of an alert for paying attention via a notification device when the behavior of the driver satisfies the alert condition.

The driver monitoring device according to the present disclosure has an effect that the driver can be appropriately alerted in accordance with the situation around the vehicle.

DESCRIPTION OF EMBODIMENTS

Hereinafter, a driver monitoring device, a driver monitoring process executed by the driver monitoring device, and a driver monitoring computer program will be described with reference to the drawings. The driver monitoring device calculates a degree of complexity of a situation around the vehicle from an image representing the surroundings of the vehicle, and sets an alert condition according to the calculated degree of complexity.

Figure 1:
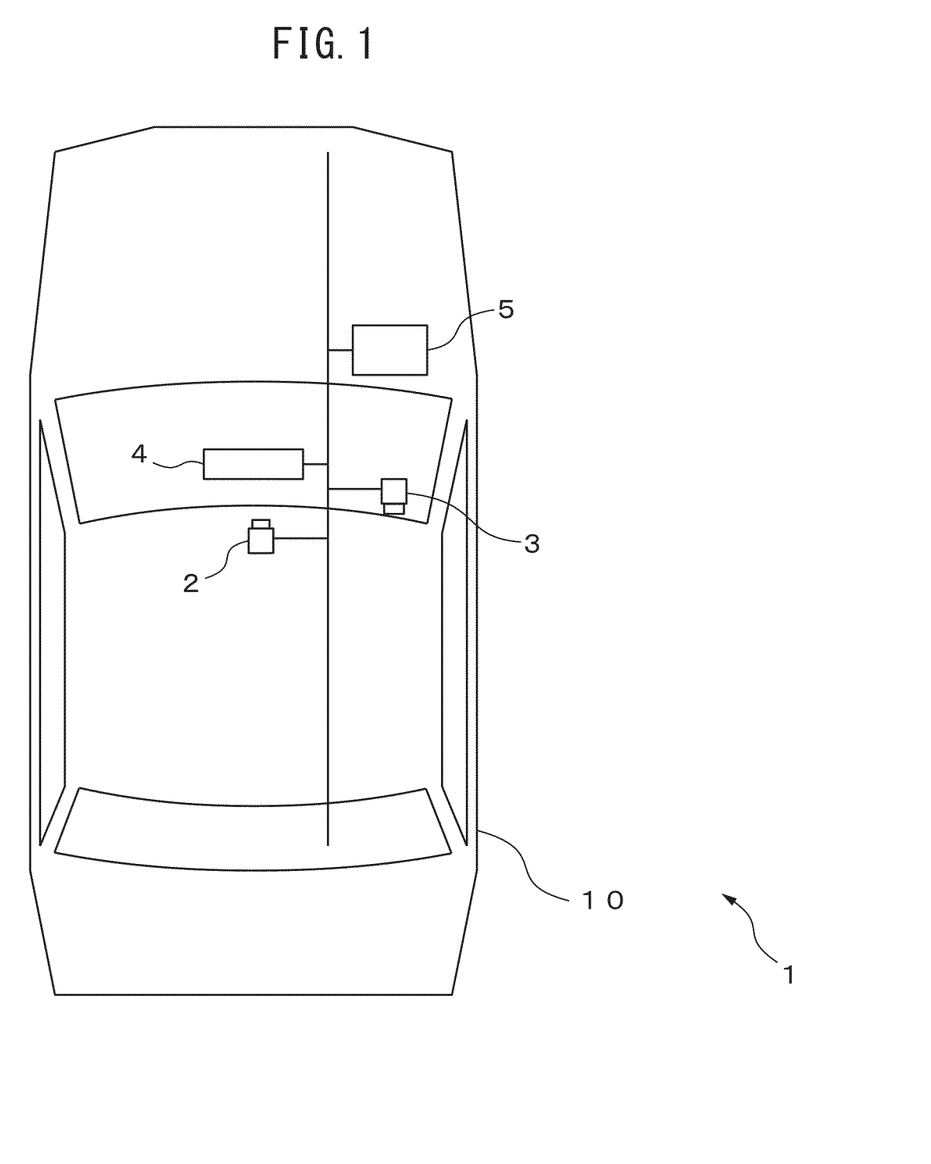
FIG. 1 schematically illustrates the configuration of a driver monitoring system including a driver monitoring device.

FIG. 1 schematically illustrates the configuration of a driver monitoring system including a driver monitoring device. In the present embodiment, the driver monitoring system 1 mounted on the vehicle 10 and controlling the vehicle 10 includes a camera 2, a driver monitoring camera 3, a notification device 4, and an electronic control unit (ECU) 5, which is an example of the driver monitoring device. The camera 2, the driver monitoring camera 3, the notification device 4, and ECU 5 are communicably connected to each other.

The camera 2 is an example of an imaging unit, and is mounted so as to be oriented to a predetermined region around the vehicle 10, such as a front region of the vehicle 10. The vehicle 10 may include a plurality of cameras taking pictures in different orientations or having different focal lengths. The camera 2 generates an image in which the predetermined region is represented by capturing the predetermined region at every predetermined capturing cycle, and outputs the generated image to ECU 5.

The driver monitoring camera 3, which is an example of an in-vehicle sensor, is mounted on or near the instrument panel and oriented to the driver so that the head of the driver seated on the driver seat of the vehicle 10 is included in the imaging target area. The driver monitoring camera 3 may include a light source such as an infrared LED. Then, the driver monitoring camera 3 generates an image (hereinafter referred to as a driver image) in which the driver is represented by capturing the driver at every predetermined capturing cycle, and outputs the generated driver image to ECU 5.

The notification device 4 is provided in the interior of the vehicle 10, and is a device that gives a predetermined notification to the driver by light, sound, vibration, character display, or image display. For this purpose, the notification device 4 includes, for example, at least one of a speaker, a light source, a vibrator, and a display device. When the notification device 4 receives a notice representing a warning from ECU 5 to the driver, the notification device 4 notifies the driver of the warning by a voice from the speaker, lighting or blinking of the light source, vibration of the vibrator, or a warning message on the display device.

ECU 5 sets an alert condition according to a degree of complexity of the situation around the vehicle 10, and notifies the driver of an alert via the notification device 4 when the set alert condition is satisfied.

Figure 2:
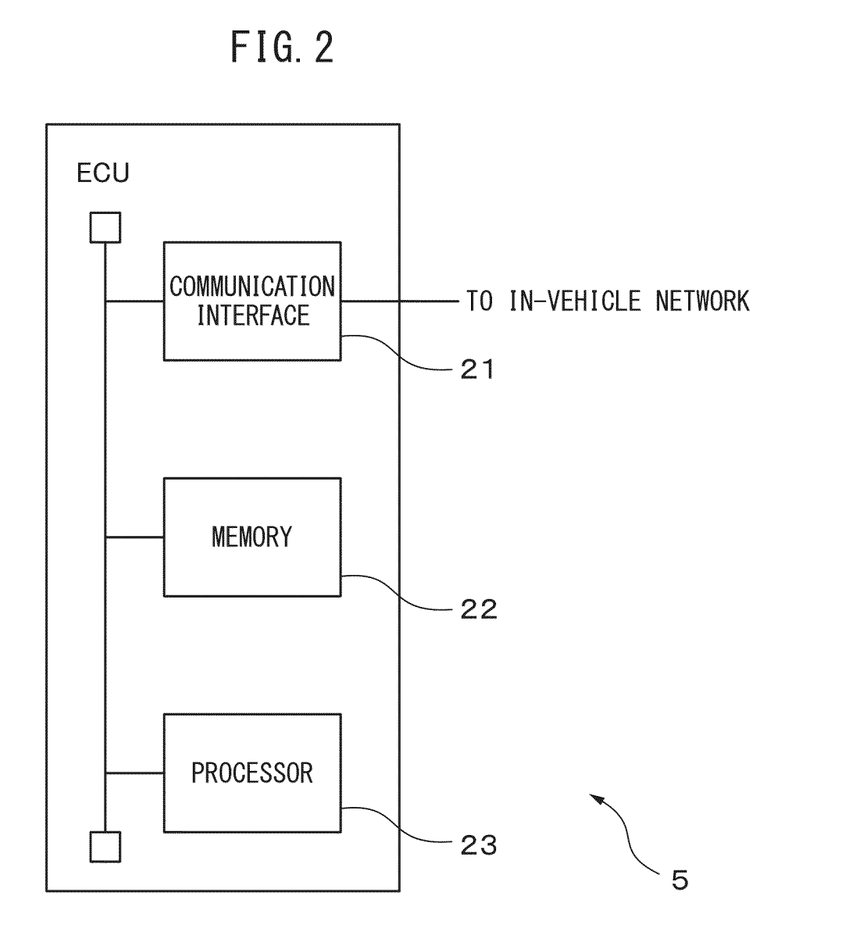
FIG. 2 illustrates a hardware configuration of an ECU, which is an example of the driver monitoring device.

FIG. 2 illustrates a hardware configuration of the ECU 5. As illustrated in FIG. 2, the ECU 5 includes a communication interface 21, a memory 22, and a processor 23. The communication interface 21, the memory 22, and the processor 23 may each be configured as separate circuits or may be integrally configured as a single integrated circuit.

The communication interface 21 includes an interface circuit for connecting the ECU 5 to other devices in the vehicle. The communication interface 21 passes the image received from the camera 2 and the driver image received from the driver monitoring camera 3 via the in-vehicle network to the processor 23. The communication interface 21 outputs the notification signal received from the processor 23 to the notification device 4 via the in-vehicle network.

The memory 22 is an example of a storage unit, and includes, for example, a volatile semiconductor memory and a non-volatile semiconductor memory. The memory 22 stores various types of data used in the driver monitoring process executed by the processor 23.

The processor 23 includes one or more central processing units (CPUs) and a peripheral circuit thereof. The processor 23 may further include another operating circuit such as a logical-arithmetic unit, an arithmetic unit, or a graphics processing unit. The processor 23 executes a driver monitoring process.

Figure 3:
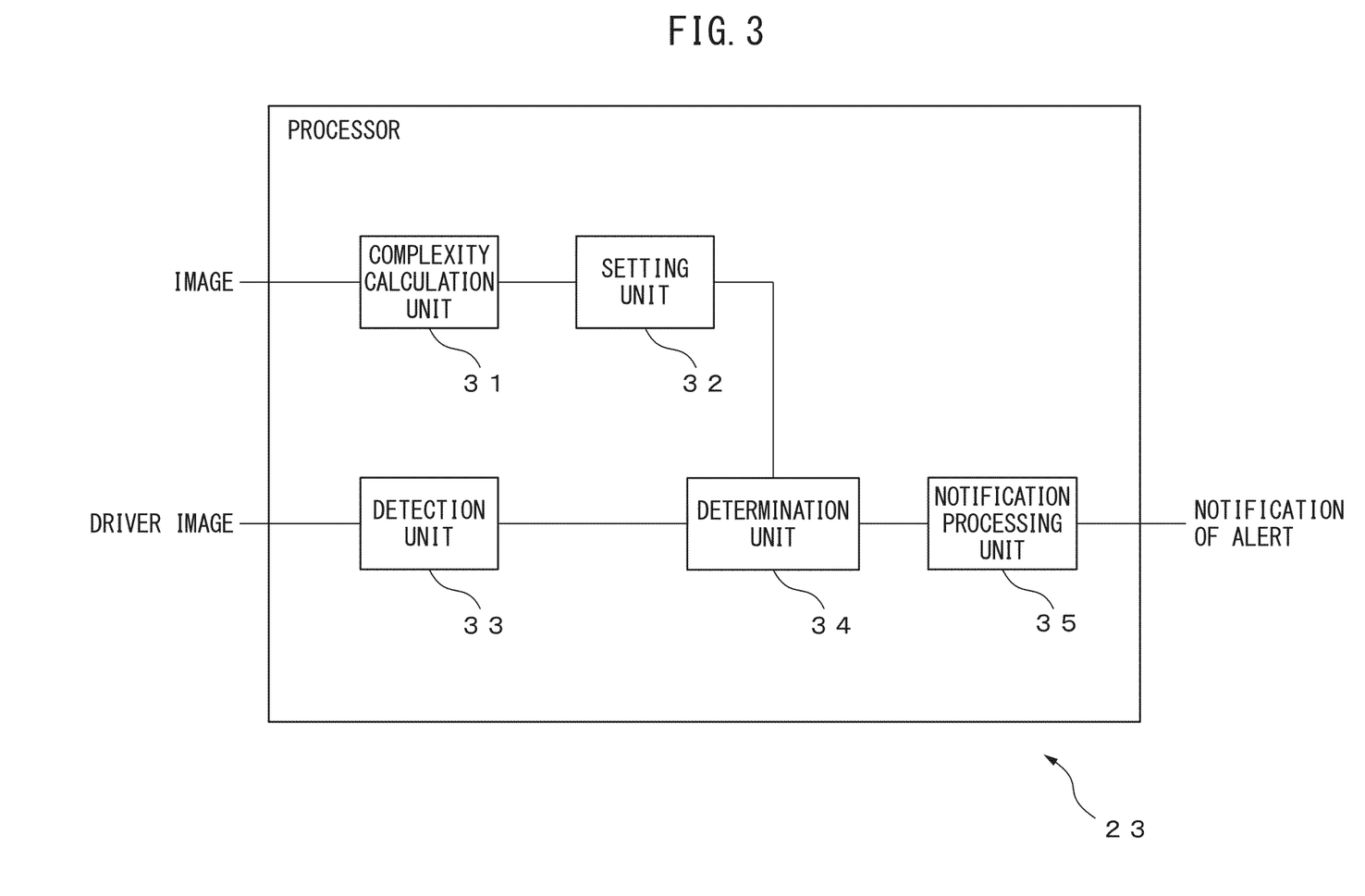
FIG. 3 is a functional block diagram of a processor of the ECU.

FIG. 3 is a functional block diagram of the processor 23 relating to the driver monitoring process. The processor 23 includes a complexity calculation unit 31, a setting unit 32, a detection unit 33, a determination unit 34, and a notification processing unit 35. Each of these units included in the processor 23 is, for example, a functional module implemented by a computer program executed by the processor 23. Alternatively, each of these units included in the processor 23 may be a dedicated operating circuit provided in the processor 23.

The complexity calculation unit 31 calculates a degree of complexity of the situation around the vehicle 10, in particular, a degree of complexity related to the appearance from the driver, based on one or more images generated by the camera 2. In the present embodiment, the complexity calculation unit 31 calculates the spatial complexity and/or the temporal complexity.

The complexity calculation unit 31 calculates, as the spatial complexity, an index indicating the degree of visual confusion such as a Subband entropy or a Feature congestion, based on the target area set on the image. Note that the complexity calculation unit 31 may use the target area as the entire image, or may use a partial region on the image as the target region. Further, the complexity calculation unit 31 may divide the image into a plurality of partial regions, and use two or more of the partial regions as target regions.

Specifically, the complexity calculation unit 31 calculates a Subband entropy according to the following equation.

$$\text{Subband entropy} = -\sum_k p_k \log_2(p_k)$$

Herein, the variable k represents a luminance value that can be taken by each pixel, for example, 0 to 255, and the variable $p_k$ represents a probability that the luminance value k is obtained in the target area where Subband entropy is calculated. Therefore, the complexity calculation unit 31 may calculate the probability $p_k$ by counting the frequency of each luminance value k in the target area on the images and dividing the frequency of the luminance value k by the number of pixels in the target region for each luminance value k. Note that the higher the spatial complexity becomes, the greater Subband entropy will be.

In addition, the complexity calculation unit 31 calculates a Feature congestion according to the method described in, for example, Ruth Rosenholtz et al., "Measuring Visual clutter", Journal of Vision (2007), 7(2); 17, 1-22. In this case, the complexity calculation unit 31 generates a map of the complexity of contrast, a map of the complexity of direction, and a map of the complexity of color. The complexity computing unit 31 calculates the Feature congestion by calculating, for each pixel, an average value of the value of the pixel of each map and averaging the average value of each pixel over the entire target area. Note that the higher the spatial complexity becomes, the greater Feature congestion will be.

The complexity calculation unit 31 converts the target area so as to be represented by a gray scale or a predetermined color system such as a Lab color system in order to generate a map of each of the contrasting, directionality, and color complexity. The complexity calculation unit 31 multiplexes the resolution of the converted target region by applying one or more times of down-sampling to the converted target region. Further, the complexity calculation unit 31 applies a filtering process for extracting a feature related to contrast, directivity, or color, such as a Gaussian difference filter or one-dimensional Gaussian filters having a different direction, to each pixel of the target region to which the resolution is multiplexed. Furthermore, the complexity calculation unit 31 generates a local map representing the contrast, directivity, or color complexity at each resolution by obtaining, for each pixel, a value representing the degree of variation such as the covariance of the value obtained by the filtering process for the pixel and the neighboring pixel. Then, the complexity calculation unit 31 applies one or more times of upsampling to the local maps having different resolutions for each of the contrast, the directionality, and the color so as to equalize the resolutions between the local maps. Then, the complexity calculation unit 31 may generate a map of each of the contrast, the directionality, and the color complexity by taking the maximum value between the local maps for each corresponding pixel.

In addition, the complexity calculation unit 31 calculates, for example, a structural similarity (SSIM) based on a plurality of images obtained in time series from the camera 2 as an index representing the temporal complexity. In this case, the complexity calculation unit 31 may calculate the SSIM for each target area according to the following equation.

$$SSIM = \frac{(2\mu_x\mu_y + C_1)(2\sigma_{xy} + C_2)}{(\mu_x^2 + \mu_y^2 + C_1)(\sigma_x^2 + \sigma_y^2 + C_2)}$$

Herein, the variable $\mu_x$ is an average pixel value of the target region in the image X of the two images obtained in time series. The variable $\mu_y$ is an average pixel value of the target region in the other image Y of the two images. The variables $\sigma_x$ and $\sigma_y$ are the standard deviation of the pixel values of the target area in the image X and the standard deviation of the pixel values of the target region in the image Y, respectively. Further, the variable $\sigma_{xy}$ is the covariance of the pixel values in the target region of the image X and the image Y. The constants $C_1$ and $C_2$ are constants for stabilizing the obtained the SSIM, respectively. The higher the temporal complexity becomes, the smaller the resulting SSIM will be, i.e., the lower the similarity between the two images will be. Note that the complexity calculation unit 31 may use the MSSIM obtained by averaging the SSIM calculated for each target area over the entire images as an index indicating the temporal complexity. Alternatively, the complexity calculation unit 31 may use the value obtained by calculating the SSIM of the target area for each set of two temporally consecutive images included in the latest predetermined period and averaging the calculated SSIM for each set as an index representing the temporal complexity.

Alternatively, the complexity calculation unit 31 may calculate an index other than SSIM as an index indicating the temporal complexity. For example, the complexity calculation unit 31 may use the value obtained by calculating a sum of squares of differences in pixel values between corresponding pixels for each set of two temporally consecutive images included in the latest predetermined period and averaging the sum of squares of the differences for each calculated set as an index representing the temporal complexity. In this case, the higher the temporal complexity becomes, the greater the value of this index will be.

The complexity calculation unit 31 notifies the setting unit 32 of the calculated degree of complexity. When the complexity is calculated for each of the two or more target regions, the complexity calculation unit 31 notifies the setting unit 32 of the degree of complexity for each target region. When two or more types of degree of complexity are calculated, the complexity calculation unit 31 notifies the setting unit 32 of the degree of complexity for each type.

The setting unit 32 sets an alert condition for issuing a warning notification that demands to monitor the surroundings of the vehicle 10 with respect to the driver's behavior, such as posture, a gaze direction, or an arousal level. In the present embodiment, the setting unit 32 relaxes the alert condition so that the warning notification of the alert is easily given to the driver as the degree of complexity increases.

Specifically, the setting unit 32 highs the range of the behavior of the driver that is the target of the alert as the degree of complexity increases. For example, the setting unit 32 extends the range of the posture or the gaze direction as the degree of complexity increases. Alternatively, the setting unit 32 increases the threshold value of the upper limit of the arousal level (hereinafter, referred to as an arousal level threshold value), which is the target of the alert, as the degree of complexity increases. In addition, the setting unit 32 may decrease the time threshold for a period in which the behavior of the driver that is the target of the alert continues as the degree of complexity increases. In addition, in a case where the degree of complexity is calculated for each of the plurality of target regions, the setting unit 32 may set the alert condition according to the highest degree of complexity among the degrees of complexity. Similarly, in a case where a plurality of types of degrees of complexity (for example, spatial complexity and temporal complexity) are calculated, the setting unit 32 may normalize the degree of complexity of each type so that the degree of complexity of each type is included in a range of a predetermined value, and then set an alert condition according to the highest degree of complexity. As described above, by using the maximum value of the individual partial regions or the degree of complexity of the individual types in the setting of the alert condition, the setting unit 32 can set the alert condition more appropriately.

Note that a reference table indicating the relationship between the degree of complexity and the alert condition may be stored in advance in the memory 22. The setting unit 32 can set an alert condition corresponding to the calculated degree of complexity by referring to the reference table.

Figure 4A:
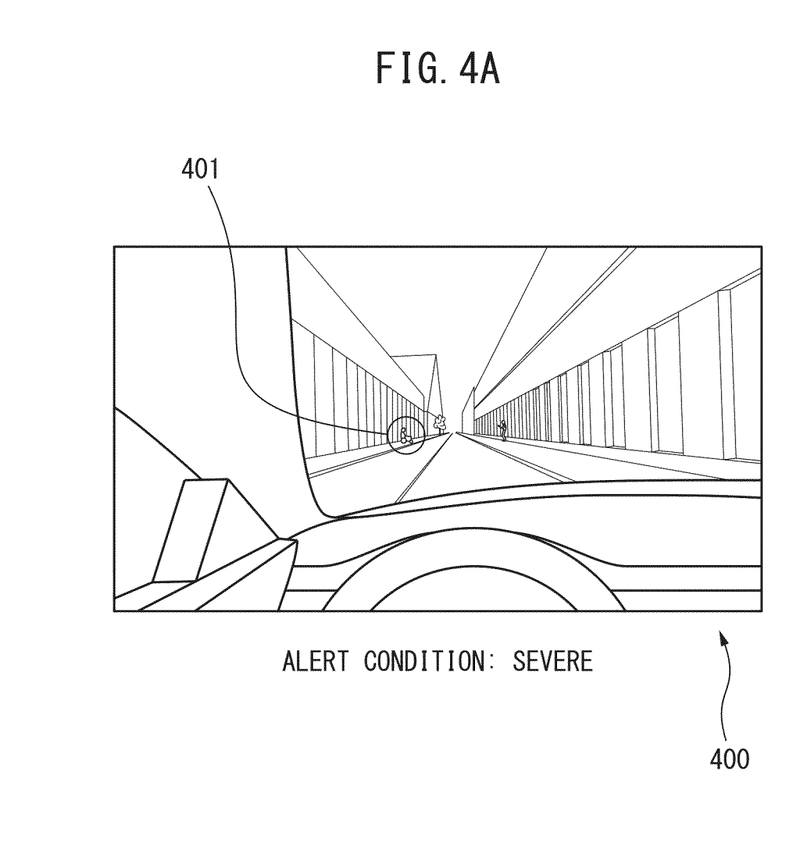
FIG. 4A illustrates an example of a degree of complexity of a situation around the vehicle.
Figure 4B:
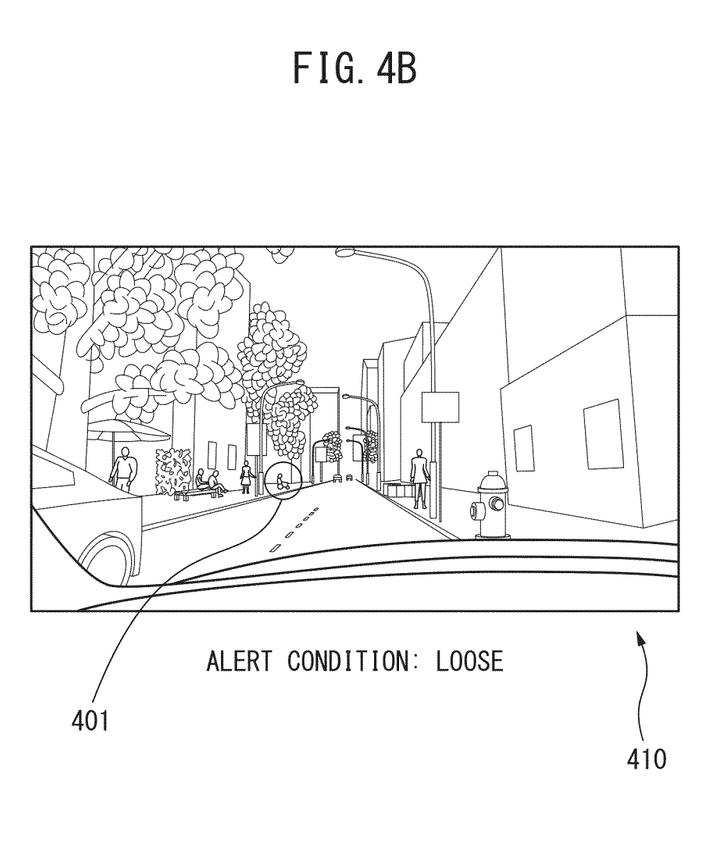
FIG. 4B illustrates another example of the degree of complexity of a situation around the vehicle.

FIG. 4A and FIG. 4B illustrates an example of a degree of complexity of a situation around the vehicle 10, respectively. In both the scene 400 illustrated in FIG. 4A and the scene 410 illustrated in FIG. 4B, person in a wheelchair 401 is trying to traverse the road ahead of the vehicle 10. In the scene 400 illustrated in FIG. 4A, the spatial complexity is relatively low because of the small numbers of persons, other vehicles, vegetation, and structures present around the vehicle 10. Therefore, the driver easily perceives the person 401. Therefore, the alert condition is set to be relatively severe, that is, to be relatively difficult to be satisfied.

On the other hand, in the scene 410 illustrated in FIG. 4B, there are many people, other vehicles, vegetation, and structures around the vehicle 10, so that the spatial complexity is relatively high. Therefore, it is difficult for the driver to perceive the person 401. Accordingly, the alert condition is set so as to be relatively loose, that is, to be relatively easily satisfied.

The setting unit 32 notifies the determination unit 34 of the set alert condition.

The detection unit 33 detects the behavior of the driver related to the alert of the monitoring around the vehicle 10. In the present embodiment, the detection unit 33 detects at least one of the posture, such as the orientation or position of the driver's face, the gaze direction, and the degree of arousal of the driver.

For example, the detection unit 33 inputs a driver image to a classifier trained in advance so as to detect a driver's face from an image, thereby detecting a region in which the driver's face is represented on the driver image (hereinafter, referred to as a face region) and detecting a plurality of features of the driver's face, such as an outer corner and an inner corner of eye, an upper eyelid, a lower eyelid, a tip of nose, and a corner of mouth. At this time, the detection unit 33 detects the face area and the features of the face by inputting the driver image to the classifier trained in advance so as to detect the face region and the features of the face represented in the image. As such a classifier, the detector 33 can use, for example, a DNN having a CNN architecture, a support vector machine, or a AdaBoost classifier. The detection unit 33 may detect the face area and the features of the face from the driver image in accordance with another method of detecting the face region and the features of the face, such as template matching.

The detection unit 33 fits each feature of the detected face to a three-dimensional face model representing the three-dimensional shape of the face. Then, the detection unit 33 detects the direction of the face of the three-dimensional face model when each feature is most fitted to the three-dimensional face model as the direction of the face of the driver. The detection unit 33 may detect the direction of the face of the driver based on the driver image in accordance with another method of determining the direction of the face represented in the image. In addition, the detection unit 33 detects, as the position of the face of the driver, a position that is separated from the driver monitoring camera 3 by a distance corresponding to the position of the driver sheet in an azimuth corresponding to the centroid of the face region from the driver monitoring camera 3.

Further, in order to detect the degree of arousal of the driver, the detection unit 33 detects the number and period of blinks, the degree of opening of the mouth, and the moving speed in the gaze direction, respectively, on the basis of a plurality of driver images obtained in time series.

In order to detect the number and period of blinks, the detection unit 33 estimates the degree of eye opening of the driver on the basis of the distance between the upper and lower eyelids of the left and right eyes in the plurality of driver images obtained in time series. For example, the detection unit 33 may set the average value of the distances between the upper eyelids and the lower eyelids of the left and right eyes as the degree of eye opening. Note that the detection unit 33 may estimate the degree of eye opening according to another method of calculating a degree of eye opening from an upper eyelid and a lower eyelid on an image. Then, the detection unit 33 calculates, as a time of one blink of the driver, a time period from when the degree of eye opening becomes a local maximum value to when the degree of eye opening becomes a next local maximum value from a time-series change of the degree of eye opening in each of the series of driver images. Then, the detection unit 33 counts the number of blinks in the latest predetermined period, and calculates the average time of the interval of the blinks as the period of the blinks.

Further, the detection unit 33 calculates the ratio of the vertical length to the horizontal length of the mouth in each driver image within the latest predetermined period, and calculates the average value as the opening degree of the mouth of the driver. The detection unit 33 may calculate the opening degree of the mouth of the driver in accordance with another method of calculating an opening degree of a mouth from a region in which the mouth is represented on an image.

Further, the detection unit 33 detects a gaze direction of the driver from each driver image, and calculates a moving speed in the gaze direction based on the detected gaze direction. For example, the detection unit 33 detects a corneal reflection image (hereinafter, referred to as a Purkinje image) of the light source and a centroid of the pupil (hereinafter, simply referred to as a pupil centroid) from a region surrounded by the upper eyelid and the lower eyelid (hereinafter, referred to as an eye region) for at least one of the left and right eyes of the driver represented on the driver image. At this time, the detection unit 33 detects the Purkinje image by template matching between the template of the Purkinje image and the eye region. Similarly, the detection unit 33 may detect the pupil by template matching between the template of the pupil and the eye region, and set the centroid of the region in which the detected pupil is represented as the pupil centroid. Then, the detection unit 33 calculates the distance between the Purkinje image and the pupil centroid, and detects the gaze direction of the driver by referring to a table representing the relationship between the distance and the gaze direction of the driver. Such a table may be stored in advance in the memory 22. Then, the detection unit 33 calculates the amount of movement in the gaze direction for each set of two consecutive driver images within the latest predetermined period, and calculates the movement speed in the gaze direction by dividing the average value of the movement amount by the acquisition interval of the driver images.

The detection unit 33 obtains the arousal level in accordance with the combination of the number and period of blinks, the opening degree of the mouth, and the movement speed in the gaze direction. For example, the detection unit 33 may detect the arousal level of the driver by referring to a reference table indicating the relationship between the combination and the arousal level. The arousal level is set to a larger value as the driver is awake.

The detection unit 33 notifies the determination unit 34 of the detected behavior of the driver.

The determination unit 34 determines whether or not the behavior of the driver detected by the detection unit 33 satisfies the alert condition set by the setting unit 32. Specifically, when the arousal level is detected as the behavior of the driver, the determination unit 34 determines that the alert condition is satisfied when the period in which the state in which the arousal level is equal to or lower than the predetermined arousal level threshold is continued becomes equal to or larger than the predetermined time threshold. In addition, when the direction of the face or the gaze direction is detected as the behavior of the driver, the determination unit 34 determines that the alert condition is satisfied when a period in which a state in which the direction of the face or the gaze direction is not included in the monitoring target range including the front direction of the vehicle 10 continues becomes equal to or larger than a predetermined time threshold. Further, in a case where the position of the face is detected as the behavior of the driver, the determination unit 34 determines that the alert condition is satisfied when the period in which the state in which the position of the face is out of the predetermined allowable range continues becomes equal to or more than the predetermined time threshold. As described above, the higher the degree of complexity, the smaller the time threshold is set. The higher the degree of complexity, the higher the arousal level threshold may be set. Similarly, as the degree of complexity is higher, the monitoring target range is narrower, that is, a range in which the driver is not looking at the monitoring target range may be set wider. Further, the higher the degree of complexity, the narrower the tolerance may be set. Therefore, the more complicated the situation around the vehicle 10, the easier the alert condition is satisfied.

The determination unit 34 notifies the notification processing unit 35 of the determination result regarding the satisfaction of the alert condition.

When the determination unit 34 notifies that the alert condition is satisfied, the notification processing unit 35 notifies the driver of an alert requesting to monitor the surroundings of the vehicle 10 via the notification device 4. For example, the notification processing unit 35 causes the speaker included in the notification device 4 to utter an audio signal or an alert sound for requesting the driver to monitor the surroundings. Alternatively, the notification processing unit 35 causes the display device included in the notification device 4 to display a warning message or icon requesting the driver to monitor the surroundings. Alternatively, the notification processing unit 35 vibrates the vibrator included in the notification device 4 or turns on or blinks the light source.

After notifying the driver of the alert via the notification device 4, the notification processing unit 35 stops the notification of the alert when the determination result that the alert condition is no longer satisfied is received from the determination unit 34.

Figure 5:
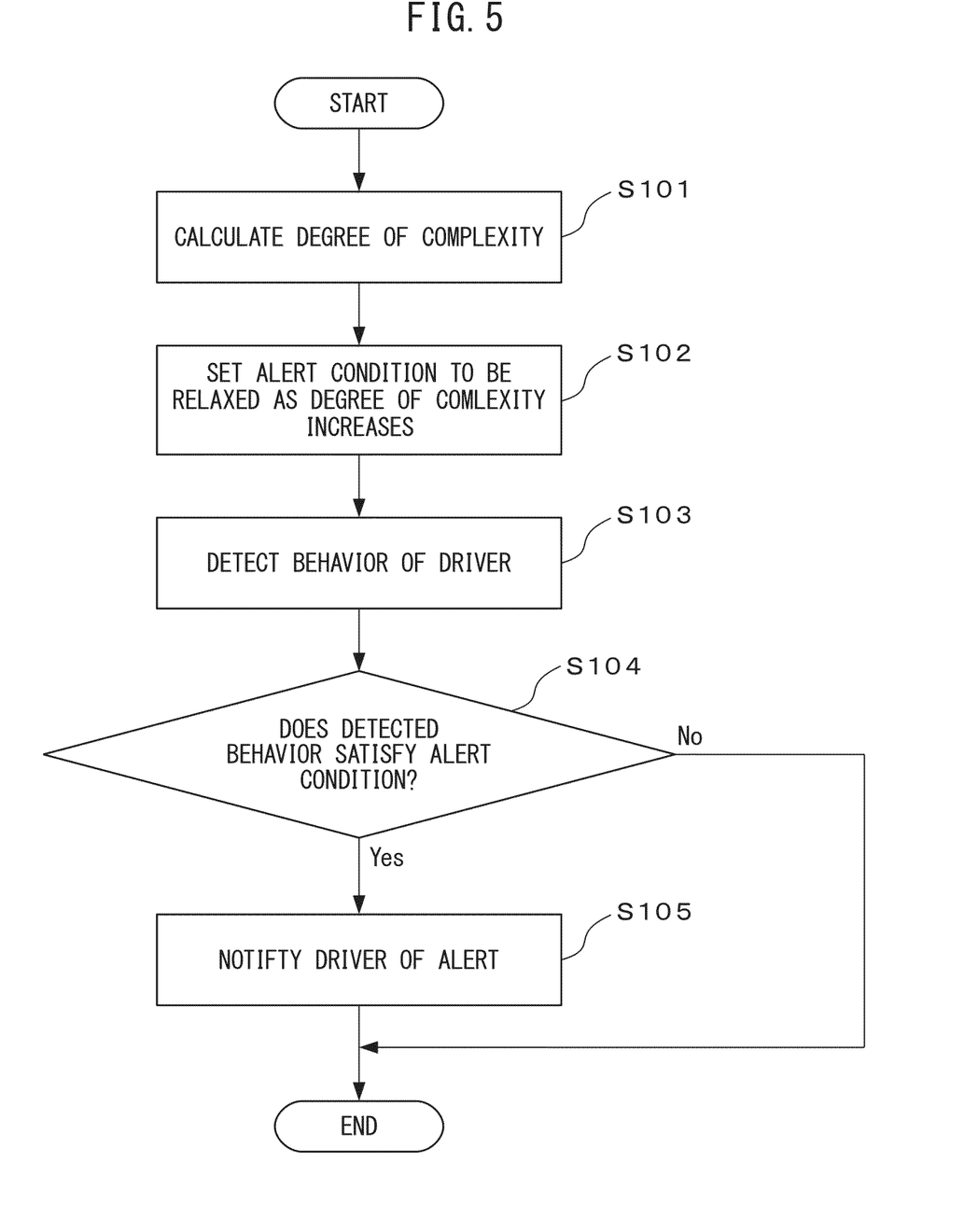
FIG. 5 is an operation flowchart of the driver monitoring process.

FIG. 5 is an operation flowchart of the driver monitoring process executed by the processor 23.

The complexity calculation unit 31 calculates the degree of complexity of the situation around the vehicles 10 based on one or more images generated by the cameras 2 (step S101). The setting unit 32 sets an alert condition so as to be relaxed as the degree of complexity increases (step S102).

The detecting unit 33 detects the behavior of the driver based on one or more driver images generated by the driver monitoring camera 3 (step S103). Then, the determination unit 34 determines whether or not the detected behavior of the driver satisfies the alert condition (step S104).

When the alert condition is satisfied (step S104—Yes), the notification processor 35 notifies the driver of an alert requesting to monitor the surroundings of the vehicle 10 via the notification device 4 (step S105).

After step S105, or when the alert condition is not satisfied in the step S104 (step S104—No), the processor 23 ends the driver monitoring process.

As described above, the driver monitoring device sets the alert condition according to the degree of complexity of the situation around the vehicle. Accordingly, the driver monitoring device can appropriately alert the driver to monitor the surroundings of the vehicle in accordance with the situation around the vehicle. In addition, the driver monitoring device can prevent the driver from feeling troublesome because the driver monitoring device is not simply aware of the increase in the degree of complexity, but is alerted only when the alert condition is satisfied.

Note that the notification processing unit 35 may increase the intensity of the alert when the state in which the alert condition is satisfied continues even after the first grace period elapses after the notification of the alert is started. For example, the notification processing unit 35 may increase the sound of the alert emitted from the speaker. Alternatively, the notification processing unit 35 may increase the number of devices that issue the alert. Further, when the state in which the alert condition is satisfied continues even after the second grace period longer than the first grace period has elapsed since the notification of the alert is started, the processor 23 may control each unit of the vehicle 10 to decelerate or stop the vehicle 10.

Further, according to a modification, when the complexity calculation unit 31 calculates the degree of complexity for each of the plurality of partial regions (for example, the right half and the left half) obtained by dividing the image as the target region, the setting unit 32 may set the alert condition corresponding to each of the individual partial regions. At this time, the setting unit 32 may relax the alert condition corresponding to the partial region whose degree of complexity is equal to or greater than the predetermined threshold value than the alert condition corresponding to the partial region whose degree of complexity is less than the predetermined threshold value. Specifically, the setting unit 32 may set the monitoring target range and the time threshold according to the degree of complexity of each partial region. The monitoring target range may be set so as to include the center of the corresponding partial region and cover the range of the orientation from the camera 2 corresponding to the partial region. Hereinafter, a monitoring target range corresponding to a partial region whose degree of complexity is greater than or equal to a predetermined threshold value is referred to as a first monitoring target range, and a monitoring target range corresponding to a partial region whose degree of complexity is less than a predetermined threshold value is referred to as a second monitoring target range. The setting unit 32 may set the first time threshold for a period in which a state in which the direction of the face or the gaze direction of the driver is not included in the first monitoring target range continues to be shorter than the second time threshold for a period in which a state in which the direction of the face or the gaze direction of the driver is not included in the second monitoring target range continues. Similarly, the setting unit 32 may make the first monitoring target range narrower than the second monitoring target range. As a result, as the degree of complexity is higher, an alert is more likely to be notified when the driver does not face the direction corresponding to the partial region. Therefore, the setting unit 32 can appropriately set the alert condition in accordance with the direction of the driver. Note that, in a case where the direction of the face or the gaze direction of the driver is included in the first monitoring target range even once within the latest predetermined period, the setting unit 32 may set the first time threshold to be the same as the second time threshold.

According to another modification, the setting unit 32 may set an alert condition regarding the arousal level in accordance with the temporal complexity, and may set an alert condition regarding the gaze direction or the posture of the driver in accordance with the spatial complexity. For example, when the driver feels drowsiness, it is possible to appropriately alert the driver to set the alert condition in accordance with the temporal complexity rather than the spatial complexity. Therefore, the setting unit 32 may set the arousal level threshold higher as the temporal complexity increases, or shorten the time threshold for the period in which the state in which the arousal level becomes equal to or lower than the arousal level threshold continues. Further, the setting unit 32 may set the monitoring target range narrower as the spatial complexity increases, or shorten the time threshold for a period in which the state in which the gaze direction or the face direction is out of the monitoring target range continues. As described above, by making the types of the alert conditions to be set differently according to the characteristics of the degree of complexity, the setting unit 32 can set the alert conditions more appropriately.

Further, the computer program for realizing the functions of the processor 23 of ECU 5 according to the above-described embodiment or modification may be provided in a form recorded in a computer-readable portable recording medium such as a semiconductor memory, a magnetic recording medium, or an optical recording medium.

As described above, a skilled person can make various modifications according to the embodiment within the scope of the present disclosure.

What is claimed is:

1. A driver monitoring device comprising:
 a processor configured to:
  calculate a degree of spatial complexity of a situation around a vehicle by calculating a Subband entropy based on at least one image generated by a camera mounted on the vehicle and representing the situation, calculate a degree of temporal complexity of the situation around the vehicle by calculating a structural similarity based on the at least one image generated by the camera, set an alert condition for urging a driver of the vehicle to pay attention based on one of the spatial complexity and the temporal complexity, relax the alert condition by adjusting one or more thresholds associated with the degree of spatial complexity or the degree of temporal complexity such that an alert is more easily given as the degree of spatial complexity or the degree of temporal complexity increases, detect a behavior of the driver; and notify the driver of an alert for paying attention via a notification device when the behavior of the driver satisfies the alert condition.

2. The driver monitoring device according to claim 1, wherein the processor calculates the degree of spatial complexity and the degree of temporal complexity for each of a plurality of partial regions into which the image is divided, and relaxes the alert condition corresponding to a partial region with the degree of spatial complexity or the degree of temporal complexity being equal to or greater than a predetermined threshold among the plurality of partial regions than the alert condition corresponding to a partial region with the degree of spatial complexity or the degree of temporal complexity being less than the predetermined threshold.

3. The driver monitoring device according to claim 1, wherein the processor sets the alert condition based on a higher one of the spatial complexity and the temporal complexity.

4. A driver monitoring method comprising:

calculating a degree of spatial complexity of a situation around a vehicle based on at least one image generated by a camera mounted on the vehicle and representing the situation;

calculating a degree of temporal complexity of the situation around the vehicle by calculating a structural similarity based on the at least one image generated by the camera;

setting an alert condition for urging a driver of the vehicle to pay attention based on one of the spatial complexity and the temporal complexity;

relaxing the alert condition by adjusting one or more thresholds associated with the degree of spatial complexity or the degree of temporal complexity such that an alert is more easily given as the degree of spatial complexity or the degree of temporal complexity increases;

detecting a behavior of the driver; and notifying the driver of an alert for paying attention via a notification device when the behavior of the driver satisfies the alert condition.

5. A non-transitory recording medium that stores a driver monitoring computer program, the driver monitoring computer program causing a processor mounted on a vehicle to execute a process comprising:

calculating a degree of spatial complexity of a situation around a vehicle based on at least one image generated by a camera mounted on the vehicle and representing the situation;

calculating a degree of temporal complexity of the situation around the vehicle by calculating a structural similarity based on the at least one image generated by the camera;

setting an alert condition for urging a driver of the vehicle to pay attention based on one of the spatial complexity and the temporal complexity;

relaxing the alert condition by adjusting one or more thresholds associated with the degree of spatial complexity or the degree of temporal complexity such that an alert is more easily given as the degree of spatial complexity or the degree of temporal complexity increases;

detecting a behavior of the driver; and notifying the driver of an alert for paying attention via a notification device when the behavior of the driver satisfies the alert condition.

* * * * *